(No Model.)
E. KEMPSHALL.
MACHINE FOR COVERING EYELETS.
No. 549,369.  Patented Nov. 5, 1895.
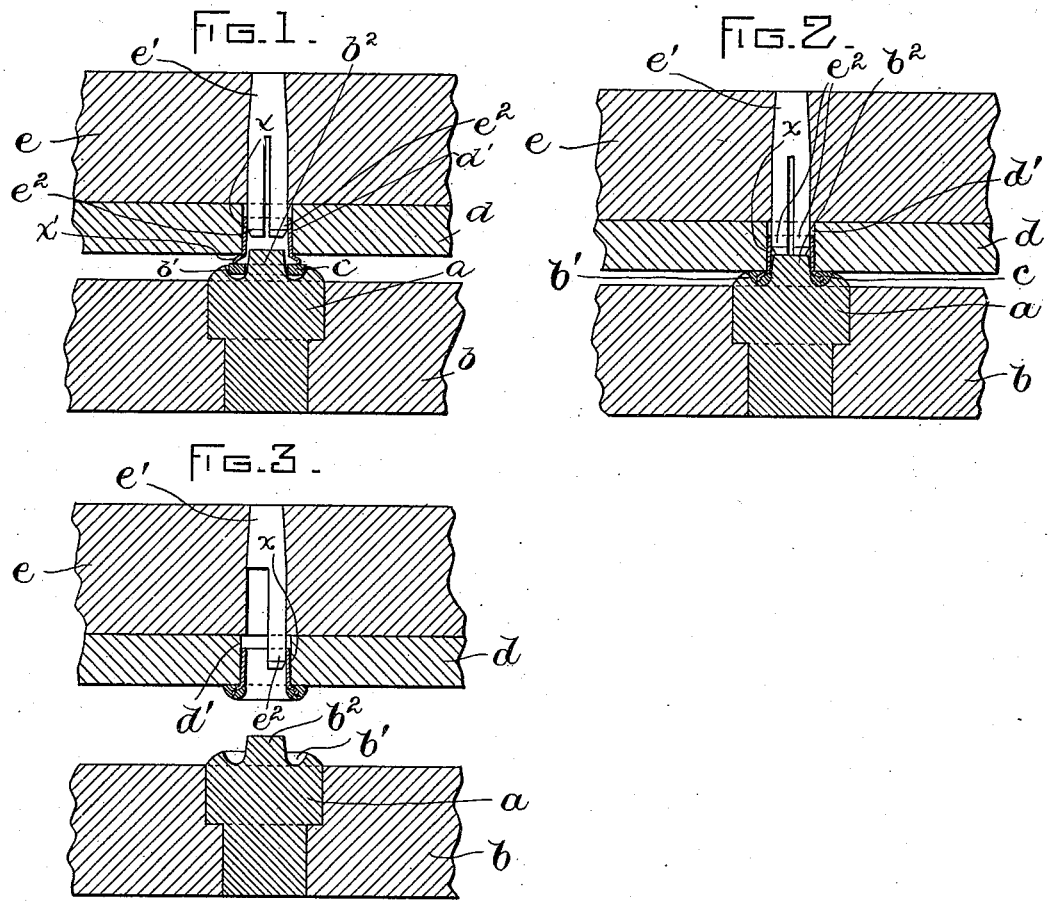
WITNESSES:
A. D. Harrison
W. P. Abell
INVENTOR:
Eleazer Kempshall
By Wright Brown & Quinby
Attys

UNITED STATES PATENT OFFICE.

ELEAZER KEMPSHALL, OF SHARON, ASSIGNOR TO THEOPHILUS KING, TRUSTEE, OF BOSTON, MASSACHUSETTS.

MACHINE FOR COVERING EYELETS.

SPECIFICATION forming part of Letters Patent No. 549,369, dated November 5, 1895.

Application filed September 9, 1895. Serial No. 561,880. (No model.)

*To all whom it may concern:*

Be it known that I, ELEAZER KEMPSHALL, of Sharon, in the county of Norfolk and State of Massachusetts, have invented certain new and useful Improvements in Machines for Covering Eyelets, of which the following is a specification.

This invention relates to mechanism for applying plastic coverings to eyelets, and has in view, for one thing, to prevent the sticking of the eyelet in the mold or die used to shape the plastic material, such sticking of the eyelet requiring a blow to release it, and thereby endangering the finish.

According to my invention, means are provided, in conjunction with the mold members, for holding onto the shank of the eyelet while the said mold members separate.

The drawings which accompany and form part of this specification illustrate embodiments of the invention.

Figure 1 shows a sectional illustration of one form of mold embodying the invention, represented in open adjustment, with an eyelet and covering ready to be united. Fig. 2 shows a similar view with the mold closed. Fig. 3 shows another similar view with the mold opened and the eyelet covered.

Referring to the drawings, the letter $a$ designates a female mold member or die, which is supported in a suitable base $b$ and formed in its top with an encircling groove $b'$, substantially semicircular in cross-section. The die has a central projection $b^2$, which rises considerably above the plane of the outer edge of the groove and is somewhat tapering. The plastic covering in the form of an annular disk or ring $c$ is placed over this central projection and rests in the groove, as clearly shown in Fig. 1. In the arrangement here shown the female die is intended to be stationary during the molding operation, and the base $b$ in practice will support a number of dies, so that a large number of eyelets can be treated at once.

The letter $d$ designates an eyelet-holding member or anvil in the form of a plate perforated, as at $d'$, to receive the shank $x$ of the eyelet, which will fit said hole closely enough to prevent its falling out. In practice this plate will have a number of perforations corresponding with the number of dies, and these perforations will all be supplied with eyelets and the plate then placed over the dies with the flanges $x'$ of the eyelets resting on the plastic rings $c$, as shown in Fig. 1. The base-plate and the eyelet-holding plate are intended to be portable and are placed in a press of any suitable kind, adjusted as shown in Fig. 1. It will be seen that pressure on the plate $d$ will drive the eyelet-flange into the plastic material, and said material will be molded around said flange, as shown in Fig. 2, the mold being composed of the groove $b'$, the central projection $b^2$, and the under face of the plate $d$, which acts in the nature of an anvil. It will be noticed that by having the central projection extend above the plane of the outer edge of the groove the plastic material is properly confined at the inner side, and a smooth finish is insured.

In conjunction with the eyelet-holding plate I employ a block $e$, which carries fastened in it a number of pins $e'$, projecting from the under side of the block and split to form expanding spring-fingers $e^2$. Only one of these split pins is here shown, although there will be in practice one for each eyelet in the plate $d$. The block is pressed down upon the plate $d$ and the spring-fingers $e^2$ enter the shank of the eyelet and by pressing outwardly clamp the said blank against the wall of the opening $d'$. Now this block may be placed in position, either before or after the pressing operation, and in either case, when lifted up, together with the plate $d$, takes the eyelet with it, as shown in Fig. 3. Then to release the eyelets, it is simply necessary to give a slight blow to the plate $d$, so as to separate it from the block.

It is evident the invention is capable of embodiment in other forms than here shown. I may, if desired, omit one of the legs of the pin.

What I claim as my invention is as follows:

1. An eyelet covering mechanism comprising in its construction an eyelet holding member, a die constructed to mold a covering about one end of an eyelet held in said member, and means for holding the opposite end of said eyelet to prevent it being withdrawn from said member by said die, substantially as and for the purpose set forth.

2. An eyelet covering mechanism, comprising in its construction an eyelet holding member or anvil, a die constructed to engage an eyelet placed in said anvil and mold a covering about one end thereof, and a spring pin arranged to engage the opposite end of said eyelet to hold the latter in said anvil when the die is withdrawn, substantially as and for the purpose set forth.

In testimony whereof I have signed my name to this specification, in the presence of two subscribing witnesses, this 22d day of August, A. D. 1895.

ELEAZER KEMPSHALL.

Witnesses:
A. D. HARRISON,
HERBERT A. HALL.